UNITED STATES PATENT OFFICE.

BYRON B. GOLDSMITH, OF NEW YORK, N. Y.

COMPOSITION OF MATTER.

No. 841,509.      Specification of Letters Patent.      Patented Jan. 15, 1907.

Application filed January 24, 1903. Serial No. 140,420.

*To all whom it may concern:*

Be it known that I, BYRON B. GOLDSMITH, a citizen of the United States, residing in the city and State of New York, have invented a new and useful Improvement in Compositions of Matter, of which the following is a specification.

My invention relates to a new composition of matter which may be used in a solid form as a mass or in solution for coating absorbent articles—such as leather, cloth, paper, or wood—although it may also be used for coating non-absorbent articles.

By means of my invention I have produced a composition which when used as a coating has a fine finish, is very durable, and, being flexible, will withstand the severest tests without cracking. Besides, the composition has any desired degree of tenacity.

This new composition I produce by means of a mixture of vulcanized oil and pyroxylin or nitrocellulose. Vulcanized oils, generally speaking, are known on the market as "rubber substitutes" and possess considerable flexibility and resiliency. They have not, however, much tenacity. I have found that by mixing vulcanized oils with pyroxylin the resulting compounds are not only resilient and flexible, but are extremely tenacious, this tenacity varying somewhat with the amount of pyroxylin which has been added to the vulcanized oil or rubber substitute.

I have found that vulcanized corn-oil is well adapted for an ingredient of my new composition. I am not, however, confined to such vulcanized corn-oil, since other vulcanized oils will answer.

The general process of making my new compound is to prepare a solution of the vulcanized oil and of the pyroxylin each with a solvent and to mix the two solutions together. The simplest plan is to use the same solvent for both ingredients just specified; but different solvents can be used for each. For instance, I may take vulcanized corn-oil, dissolve it in amyl acetate, and mix it with pyroxylin dissolved in amyl acetate, or, on the other hand, I may dissolve the vulcanized corn-oil in turpentine and mix the resulting solution with pyroxylin dissolved in amyl acetate, or I may, if I choose, take vulcanized corn-oil dissolved in amyl acetate and mix it with pyroxylin dissolved in a mixture of amyl acetate, fusel-oil, and benzene. The addition of small proportions of turpentine to any of these solutions has the beneficial effect of clearing them and of making the ultimate coating more brilliant.

My new compound which is thus produced varies with the nature of the vulcanized oil which has been used to produce it. Thus if, as I prefer, I prepare a solution of vulcanized non or semi drying oil and mix it with a solution of pyroxylin a composition for coatings will have been produced which has considerable flexibility and quite sufficient gloss for ordinary pusposes. If, on the other hand, I use a vulcanized drying-oil, it will be found that when it is dissolved and mixed with a solution of pyroxylin a composition for coatings will have been produced which, while somewhat wanting in flexibility, has an even greater gloss. I may therefore produce a composition having the characteristics of great gloss and great flexibility by combining a solution of vulcanized drying-oil and of vulcanized non-drying oil with a solution of pyroxylin.

I can, naturally, color the compound in any usual way. It is also useful for some purposes to add to the compound above described a non-drying oil which has not been vulcanized for the purpose of imparting additional flexibility to the compound, or to add to it a drying-oil which has not been vulcanized for the purpose of imparting an additional gloss, or to add to it both a non-vulcanized drying-oil and a non-vulcanized non-drying oil for the purpose of imparting to the composition both additional gloss and additional flexibility. It will thus be seen that in this aspect my invention consists of a compound of a vulcanized oil and pyroxylin, which vulcanized oil may be vulcanized drying-oil, vulcanized non-drying oil, or both, and to which composition may be added ordinary non-vulcanized drying-oil, or ordinary non-vulcanized non-drying oil, or both, to give the requisite properties of tenacity, flexibility, and gloss in the degrees desired.

As the method of vulcanizing oils is well known to those skilled in the art and as the processes for vulcanizing oils are very numerous, I need not recite them here. I may say, however, that vulcanized oils go into solution very slowly, and for this reason they have heretofore been looked upon as rather insoluble bodies. I have found, however, that vulcanized oils will go into solution if the dissolving action be sufficiently prolonged and that some vulcanized oils which seem almost insoluble can be made soluble by first melting them under the action of a gentle heat.

By the term "vulcanized oils" I mean to include only such combinations of oil and sulfur as are solid, and not viscid fluids or balsams, which are made by thickening up oils by heating them with sulfur, nor the thickened oils made by treating oils with small amounts of chlorid of sulfur, such as from two to ten per cent. Both of these above-mentioned products are not solid substances, but are merely thickened oils. Such compounds mixed with pyroxilin are very similar to the mixtures of pyroxilin and non-drying oils or blown oils. They are very different from the mixture of pyroxylin and the solid vulcanized oils which I use.

I may further state that many different substances have been mixed with pyroxylin, and that among them oils, blown oils, and sulfureted oils have been so mixed. Such compounds, however, do not give so great a gloss or flexibility as is the case with the compound of my invention, nor do they allow of such a wide range of variation of mixtures to produce the different properties described in the wished-for degree.

I may add that many other substances may manifestly be added to the compound which I have above described for the purpose of adding to the resulting composition any other quality or property.

When the composition is used as a mass, its properties may be varied by the addition of other substances, just as when it is used for a coating. This allows of the use of this new composition of matter alone or mixed with other substances for a great variety of purposes.

What I claim is—

1. A composition of matter comprising pyroxylin and an oil which has been vulcanized to the extent necessary to convert it into a caoutchouc-like mass, substantially as described.

2. A composition of matter comprising pyroxylin and a non-drying oil which has been vulcanized to the extent necessary to convert it into a caoutchouc-like mass, substantially as described.

3. A composition of matter comprising pyroxylin and vulcanized corn-oil which has been vulcanized to the extent necessary to convert it into a caoutchouc-like mass, substantially as described.

4. A composition of matter comprising pyroxylin and a drying-oil which has been vulcanized to the extent necessary to convert it into a caoutchouc-like mass, substantially as described.

5. A composition of matter comprising vulcanized oil, pyroxylin and non-drying oil, substantially as described.

6. A composition of matter comprising vulcanized oil, pyroxylin and drying-oil, substantially as described.

7. A composition of matter comprising vulcanized oil, pyroxylin, non-drying oil and drying-oil, substantially as described.

8. A composition of matter comprising vulcanized drying-oil, vulcanized non-drying oil, pyroxylin, non-drying oil and drying-oil, substantially as described.

In testimony whereof I have signed my name to this specification in the presence of two subscribing witnesses.

BYRON B. GOLDSMITH.

Witnesses:
C. E. FINN,
R. MÜLLER.